US011251974B2

(12) United States Patent
Liu et al.

(10) Patent No.: US 11,251,974 B2
(45) Date of Patent: *Feb. 15, 2022

(54) PROVISIONING MULTIPLE DIGITAL CERTIFICATES

(71) Applicant: DigiCert, Inc., Lehi, UT (US)

(72) Inventors: Quentin Liu, San Jose, CA (US); Marc Williams, San Jose, CA (US); Richard F. Andrews, Menlo Park, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,742

(22) Filed: Jan. 25, 2013

(65) Prior Publication Data

US 2013/0145155 A1 Jun. 6, 2013

Related U.S. Application Data

(63) Continuation of application No. 12/639,771, filed on Dec. 16, 2009, now Pat. No. 8,364,954.

(51) Int. Cl.
| | |
|---|---|
| *H04L 9/32* | (2006.01) |
| *H04L 9/08* | (2006.01) |
| *H04L 29/06* | (2006.01) |

(52) U.S. Cl.
CPC .......... *H04L 9/3263* (2013.01); *H04L 9/0891* (2013.01); *H04L 63/0823* (2013.01); *H04L 2209/56* (2013.01)

(58) Field of Classification Search
CPC ... H04L 9/3263; H04L 9/3265; H04L 9/3268; H04L 63/0823

(Continued)

(56) References Cited

U.S. PATENT DOCUMENTS 6,085,320 A * 7/2000 Kaliski, Jr. ................... 713/168
6,978,364 B1 * 12/2005 Balaz et al. .................. 713/153
(Continued)

FOREIGN PATENT DOCUMENTS

JP 2008-042753 2/2008

OTHER PUBLICATIONS

Cooper et al. RFC 5280—"Internet X.509 Public Key Infrastructure Certificate and Certificate Revocation List (CRL) Profile" The IETF Trust (2008), retrieved from the Internet: <<http://www.ietf.org/rfc/rfc5280.txt>> 141 pages.

(Continued)

*Primary Examiner* — Zachary A. Davis
(74) *Attorney, Agent, or Firm* — Knobbe, Martens, Olson & Bear, LLP

(57) ABSTRACT

A method of provisioning a first digital certificate and a second digital certificate based on an existing digital certificate includes receiving information related to the existing digital certificate. The existing digital certificate includes a first name listed in a Subject field and a second name listed in a SubjectAltName extension. The method also includes receiving an indication from a user to split the existing digital certificate and extracting the first name from the Subject field and the second name from the SubjectAltName extension of the existing digital certificate. The method further includes extracting the public key from the existing digital certificate, provisioning the first digital certificate with the first name listed in a Subject field of the first digital certificate and the public key, and provisioning the second digital certificate with the second name listed in a Subject field of the second digital certificate and the public key.

19 Claims, 6 Drawing Sheets

(58) Field of Classification Search
USPC .................................. 713/156, 175, 157
See application file for complete search history.

(56) References Cited

U.S. PATENT DOCUMENTS

| | | | |
|---|---|---|---|
| 6,990,684 | B2 | 1/2006 | Futamura et al. |
| 7,131,003 | B2 * | 10/2006 | Lord et al. .................. 713/168 |
| 7,409,553 | B2 * | 8/2008 | Kumagai et al. ............ 713/175 |
| 7,774,599 | B2 * | 8/2010 | Guo et al. .................... 713/164 |
| 8,135,950 | B2 | 3/2012 | Parkinson |
| 8,364,954 | B2 * | 1/2013 | Liu et al. .................... 713/156 |
| 8,375,204 | B2 | 2/2013 | Liu et al. |
| 8,380,981 | B2 | 2/2013 | Beckwith et al. |
| 8,613,661 | B2 * | 12/2013 | Adiraju .......................... 463/29 |
| 9,100,191 | B2 | 8/2015 | Liu et al. |
| 2002/0108042 | A1 | 8/2002 | Oka et al. |
| 2002/0147905 | A1 | 10/2002 | Perlman |
| 2003/0126431 | A1 | 7/2003 | Beattie et al. |
| 2004/0177246 | A1 | 9/2004 | Balaz et al. |
| 2005/0114653 | A1 | 5/2005 | Sudia |
| 2005/0287990 | A1 | 12/2005 | Mononen et al. |
| 2006/0129804 | A1 | 6/2006 | Satkunanathan et al. |
| 2006/0265508 | A1 | 11/2006 | Angel et al. |
| 2007/0101125 | A1 | 5/2007 | Lain et al. |
| 2008/0209208 | A1 | 8/2008 | Parkinson |
| 2008/0228651 | A1 | 9/2008 | Tapsell |
| 2009/0092247 | A1 | 4/2009 | Kido et al. |
| 2009/0132812 | A1 | 5/2009 | Kobozev et al. |
| 2010/0048296 | A1 * | 2/2010 | Adiraju .......................... 463/29 |
| 2010/0185864 | A1 | 7/2010 | Gerdes et al. |
| 2011/0145567 | A1 | 6/2011 | Liu et al. |
| 2011/0145569 | A1 | 6/2011 | Liu et al. |
| 2013/0138953 | A1 | 5/2013 | Liu et al. |
| 2013/0159702 | A1 | 6/2013 | Peeters |

OTHER PUBLICATIONS

Helm and Mugaratham, "SujectAltNames in X.509 Certificates," version 8, Aug. 2004, retrieved from the Internet: << http://www.es.net/pub/esnet-doc/SubjectAltName.pdf>>, 6 pages.

"Public key certificate"—Wikipedia Entry, retrieved from the Internet: <<http//en.wikipedia.org/wiki/Public_key_certificate>>, Feb. 2010 5 pages.

"Using Subject Altname," [Online Discussion Board], Oct. 2002, retrieved from the Internet: <<http://www.issociate.de/board/22008/Using_subjectAltName.html>>, 3 pages.

USPTO; Office Action for U.S. Appl. No. 12/639,765, dated Jun. 8, 2012.

USPTO; Notice of Allowance for U.S. Appl. No. 12/639,765, dated Oct. 5, 2012.

USPTO; Office Action for U.S. Appl. No. 12/639,771, dated Jul. 13, 2012.

USPTO; Notice of Allowance for U.S. Appl. No. 12/639,771, dated Sep. 26, 2012.

USPTO; Office Action for U.S. Appl. No. 13/750,828, dated Nov. 20, 2014.

USPTO; Notice of Allowance for U.S. Appl. No. 13/750,828, dated Mar. 26, 2015.

USPTO. Office Action for U.S. Appl. No. 14/231,698, dated Sep. 30, 2014.

USPTO. Notice of Allowance for U.S. Appl. No. 14/231,698, dated Feb. 12, 2015.

USPTO, U.S. Appl. No. 13/750,828, Notice of Allowance dated Mar. 26, 2015, 12 pages.

* cited by examiner

PROVISIONING MULTIPLE DIGITAL CERTIFICATES

CROSS-REFERENCES TO RELATED APPLICATIONS

This Application is a continuation of U.S. application Ser. No. 12/639,771, filed Dec. 16, 2009, and entitled "Method and System for Provisioning Multiple Digital Certificates," which is incorporated herein by reference. Pending U.S. patent application Ser. No. 12/639,765, filed Dec. 16, 2009, and entitled "Method and System to Combine Multiple Digital Certificates Using the Subject Alternative Name Extension," is incorporated herein by reference.

BACKGROUND

X.509 certificates, also referred to as digital certificates, are used in a wide variety of applications. These digital certificates provide a method to verify the identity of a user, are a component of a secure communications channel, and deliver authentication information based on these capabilities.

X.509 certificates are defined by the Telecommunication Standardization Sector (ITU¬T) of the International Telecommunication Union (ITU) as part of the Directory (X.500) series.

The structure of an X.509 v3 digital certificate is as follows:
Certificate
  Version
  Serial Number
  Algorithm ID
  Issuer
  Validity
    Not Before
    Not After
  Subject
  Subject Public Key Info
    Public Key Algorithm
    Subject Public Key
  Issuer Unique Identifier (Optional)
  Subject Unique Identifier (Optional)
  Extensions (Optional)
    . . .
Certificate Signature Algorithm
Certificate Signature X.509 certificates bind the name of an entity in the real world, such as a company "VeriSign," to a public key. The "Subject" field of the certificate provides a location for storage of the name, which is bound to the public key stored in the certificate. The subject name is in the form of an X.500 or LDAP directory name and is often identical to the entity's directory name, e.g., the fully qualified domain name of the website: www.verisign.com. Because of this close association, the X.509 certificate's Subject name is often referred to as the distinguished name. Many digital certificates contain only one name, which is stored in the Subject field.

Starting with X.509 v3 certificates, the subject alternative name extension was provided to allow identities to be bound to the subject of the certificate. These identities may be included in addition to or in place of the identity in the subject field of the certificate. Defined options include an Internet electronic mail address, a DNS name, an IP address, or a Uniform Resource Identifier (URI). Additional description related to the structure of X.509 digital certificates may be found in RFC 5280 from the IETF.

Despite the benefits available through the use of digital certificates, there is a need in the art for improved methods and systems related to the use of digital certificates.

SUMMARY

The present invention relates generally to computer networks. More specifically, the present invention relates to methods and systems for managing digital certificates. Merely by way of example, the invention has been applied to a method of provisioning multiple digital certificates from an original digital certificate. In a particular embodiment, two new certificates are provisioned from an existing digital certificate, with the name in the Subject field of the existing certificate stored in the Subject field of the first new certificate and the name in the SubjectAltName extension of the existing certificate stored as the name in the Subject field of the second new certificate. The public key of the existing certificate is used as the public key for both the first and second new certificate. In another particular embodiment, multiple new certificates are provisioned from original certificate with a name stored in the SubjectAltName extension of the original certificate. A Certificate Signing Request is received for each of the new certificates, thereby providing a distinct public key for each of the new certificates. The methods and techniques can be applied to a variety of computer networks and communications systems.

According to an embodiment of the present invention, a method of provisioning a first digital certificate and a second digital certificate based on an existing digital certificate is provided. The method includes receiving information related to the existing digital certificate. The existing digital certificate includes a first name listed in a Subject field and a second name listed in a SubjectAltName extension. The method also includes receiving an indication from a user to split the existing digital certificate, extracting the first name from the Subject field of the existing digital certificate, and extracting the second name from the SubjectAltName extension of the existing digital certificate. The method further includes extracting the public key from the existing digital certificate, provisioning the first digital certificate with the first name listed in a Subject field of the first digital certificate and the public key, and provisioning the second digital certificate with the second name listed in a Subject field of the second digital certificate and the public key.

According to another embodiment of the present invention, a certificate provisioning system includes a data processor, a communications module coupled to the data processor, and a computer readable medium coupled to the data processor. The computer readable medium stores a plurality of instructions for controlling the data processor to provision a first digital certificate and a second digital certificate based on an existing digital certificate. The plurality of instructions include instructions that cause the data processor to receive information related to the existing digital certificate. The existing digital certificate includes a first name listed in a Subject field and a second name listed in a SubjectAltName extension. The plurality of instructions also include instructions that cause the data processor to receive an indication from a user to split the existing digital certificate, instructions that cause the data processor to extract the first name from the Subject field of the existing digital certificate, and instructions that cause the data processor to extract the second name from the SubjectAltName extension of the existing digital certificate. The plurality of instructions further include instructions that cause the data processor to extract the public key from the existing digital certificate, instructions that cause the data processor to provision the first digital certificate with the first name listed in a Subject field of the first digital certificate and the public key, and instructions that cause the data processor to provision the second digital certificate with the second name listed in a Subject field of the second digital certificate and the public key.

According to a specific embodiment of the present invention, a method of provisioning a first digital certificate and a second digital certificate based on an existing digital certificate is provided. The method includes receiving an indication to split the existing digital certificate. The existing digital certificate includes a public key, a first name listed in a Subject field, and a second name listed in a SubjectAlt-Name extension. The method also includes receiving a first CSR including a first new public key different from the public key, extracting the first name from the Subject field of the existing digital certificate, and provisioning the first digital certificate with the first name listed in a Subject field of the first digital certificate and the first new public key. The method further includes determining that the second name is listed in the SubjectAltName extension of the existing digital certificate, receiving a second CSR including a second new public key different from the public key, extracting the second name from the SubjectAltName extension of the existing digital certificate, and provisioning the second digital certificate with the second name listed in a Subject field of the second digital certificate and the second new public key.

According to another specific embodiment of the present invention, a certificate provisioning system is provided. The certificate provisioning system includes a data processor, a communications module coupled to the data processor, and a computer readable medium coupled to the data processor. The computer readable medium stores a plurality of instructions for controlling the data processor to provision a first digital certificate and a second digital certificate based on an existing digital certificate. The plurality of instructions include instructions that cause the data processor to receive an indication to split the existing digital certificate. The existing digital certificate includes a public key, a first name listed in a Subject field, and a second name listed in a SubjectAltName extension. The plurality of instructions also include instructions that cause the data processor to receiving a first CSR including a first new public key different from the public key, instructions that cause the data processor to extract the first name from the Subject field of the existing digital certificate, and instructions that cause the data processor to provision the first digital certificate with the first name listed in a Subject field of the first digital certificate and the first new public key. The plurality of instructions further include instructions that cause the data processor to determine that the second name is listed in the SubjectAltName extension of the existing digital certificate, instructions that cause the data processor to receive a second CSR including a second new public key different from the public key, instructions that cause the data processor to extract the second name from the SubjectAltName extension of the existing digital certificate, and instructions that cause the data processor to provision the second digital certificate with the second name listed in a Subject field of the second digital certificate and the second new public key.

Numerous benefits are achieved by way of the present invention over conventional techniques. For example, embodiments of the present invention provide an owner of digital certificates with the ability to split a single digital certificate into multiple digital certificates sharing a single private key. The new certificates can be easier to manage, especially if the servers on which the new certificates are installed are managed by different groups or if the payments for each of the new certificates comes from different budgets. Embodiments of the present invention provide a certificate owner with different ways to specify the order details for each of the new certificates, providing the owner with increased flexibility in provisioning the new certificates in accordance with particular owner preferences.

Another benefit provided by embodiments of the present invention is that the certificate owner can split a single certificate into multiple certificates with different validity end dates, such that the work of renewing certificates and installing the renewed certificates can be spread out over a longer period of time. As an example, if many certificates need to be renewed at the same time, the owner might find it onerous to renew and install the renewed certificates all at once and spreading out the renewal period over a longer time may be more manageable for the certificate owner. Moreover, embodiment of the present invention are applicable to processes for splitting certificates as a prelude to migrating computers to different data centers or in preparation for divesting a business, when some computers are moved under the care of new owners. Furthermore, the methods and systems described herein provides benefits not available using a conventional system for enrolling new certificates because many of the order entry fields might remain unchanged and therefore would not have to be re-entered during the application process. These and other embodiments of the invention along with many of its advantages and features are described in more detail in conjunction with the text below and attached figures.

DETAILED DESCRIPTION

Embodiments of the present invention relate to methods and systems for provisioning multiple digital certificates based on an original certificate with multiple names. Some certificate users/customers, also referred to as certificate owners, may find that deploying several certificates, each with one name, is more convenient than deploying one certificate with multiple names. In an embodiment, a Certificate Authority (CA) that has provisioned an existing certificate with multiple names, can offer the certificate owner a "Split" feature. Other embodiments are also described herein.

Figure 1:
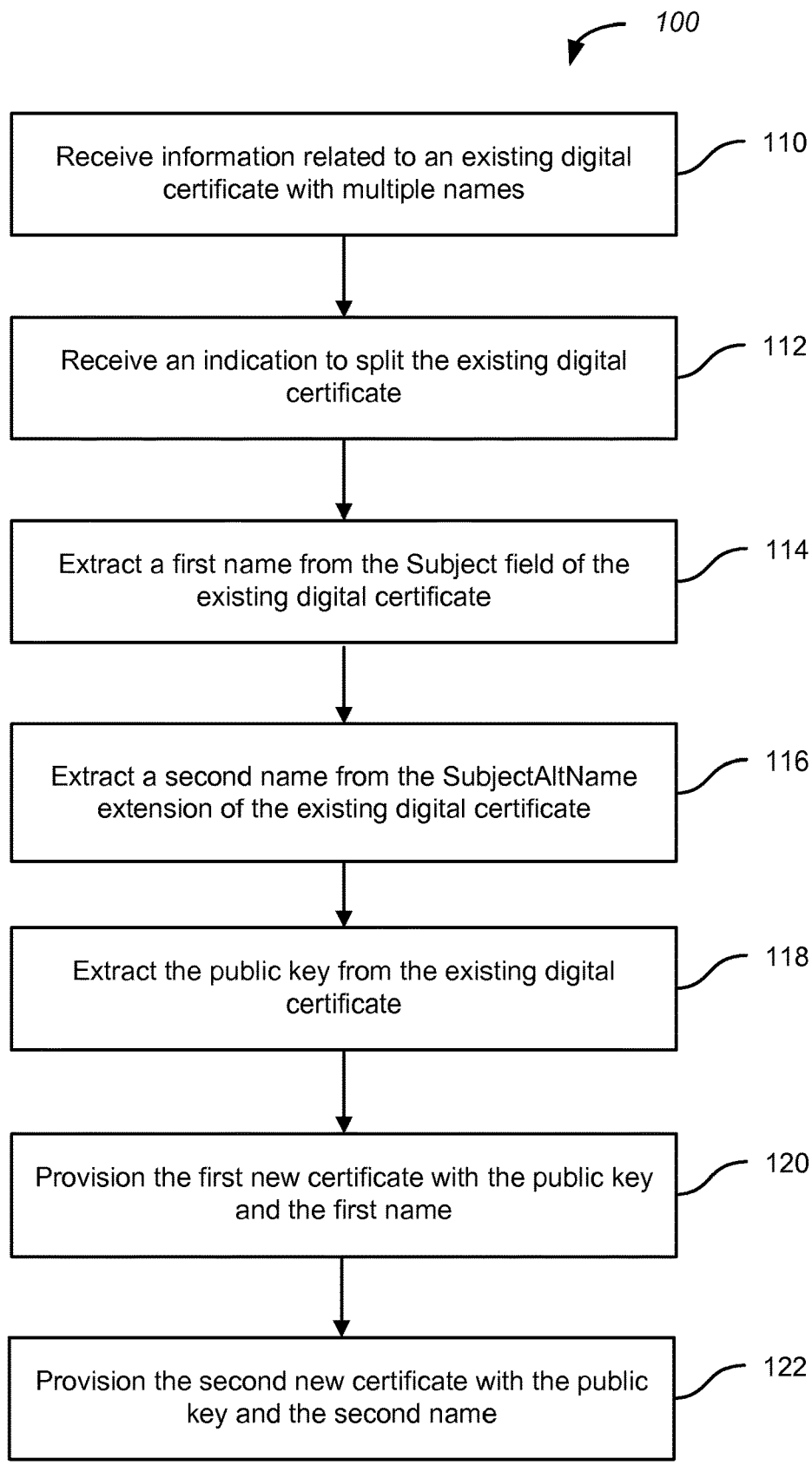
FIG. 1 is a simplified flowchart illustrating a method of provisioning two new certificates according to an embodiment of the present invention.

FIG. 1 is a simplified flowchart illustrating a method of provisioning two new certificates according to an embodiment of the present invention. In this example, an existing certificate with multiple names, also referred to as an original certificate, has previously been provisioned to a user. A first name of the multiple names is stored in the Subject field and the other names are stored in the SubjectAltName extension. A benefit provided by a certificate with multiple names is that the certificate with multiple names can be used on any server whose name is stored in the certificate. However, the certificate owner may determine that deploying several certificate, each with one name, may be more convenient than deploying an certificate with multiple names.

The method 100 includes receiving information related to an existing digital certificate with multiple names (110). An indication is received to split the existing digital certificate into multiple certificates (112). Typically, user or owner will indicate which certificate with multiple names is to be split using the CA's website. In some embodiments, receiving information related to the existing certificate and the indication to split the existing certificate are received concurrently.

The certificate provisioning server will extract the name from the Subject field of the existing digital certificate (114) and a name from the SubjectAltName extension of the existing digital certificate (116). It should be noted that the exemplary embodiment illustrated in FIG. 1 is for provisioning of two new certificates. However, it will be evident to one of skill in the art that additional new certificates can be provisioned if there is more than one name in the SubjectAltName extension of the existing digital certificate. In fact, for certificates with more than one name in the SubjectAltName extension, additional names will be extracted from the SubjectAltName extension for use in provisioning additional certificates. The public key will also be extracted from the existing digital certificate (118).

The first new certificate will be provisioned by the CA using the public key and the first name (120) and the second new certificate will be provisioned by the CA using the public key and the second name (120). Since the user has already been approved to possess a certificate that includes both the first name and the second name, the CA can immediately issue the new certificates provisioned using the method 100. Details from the existing digital certificate, including technical, corporate, and billing contact information, method of payment and payment details, the vendor of web server software, the service period, and the like, will be utilized in provisioning the new certificates.

It should be noted that for some master certificates that contain more than two names, embodiments of the present invention enable the user to select which of the names stored in the master certificate are used in pick and choose which of the total pool of names should be used to create the new split certificates. For example, if the master certificate contains a name in the Subject field and four names in the SubjectAltName extension, the user will have the ability to choose two, three, four, or all five of the names in provisioning the new certificates. In this example, a new certificate would only be generated for the names selected by the user.

It should be appreciated that the specific steps illustrated in FIG. 1 provide a particular method of provisioning two new certificates according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
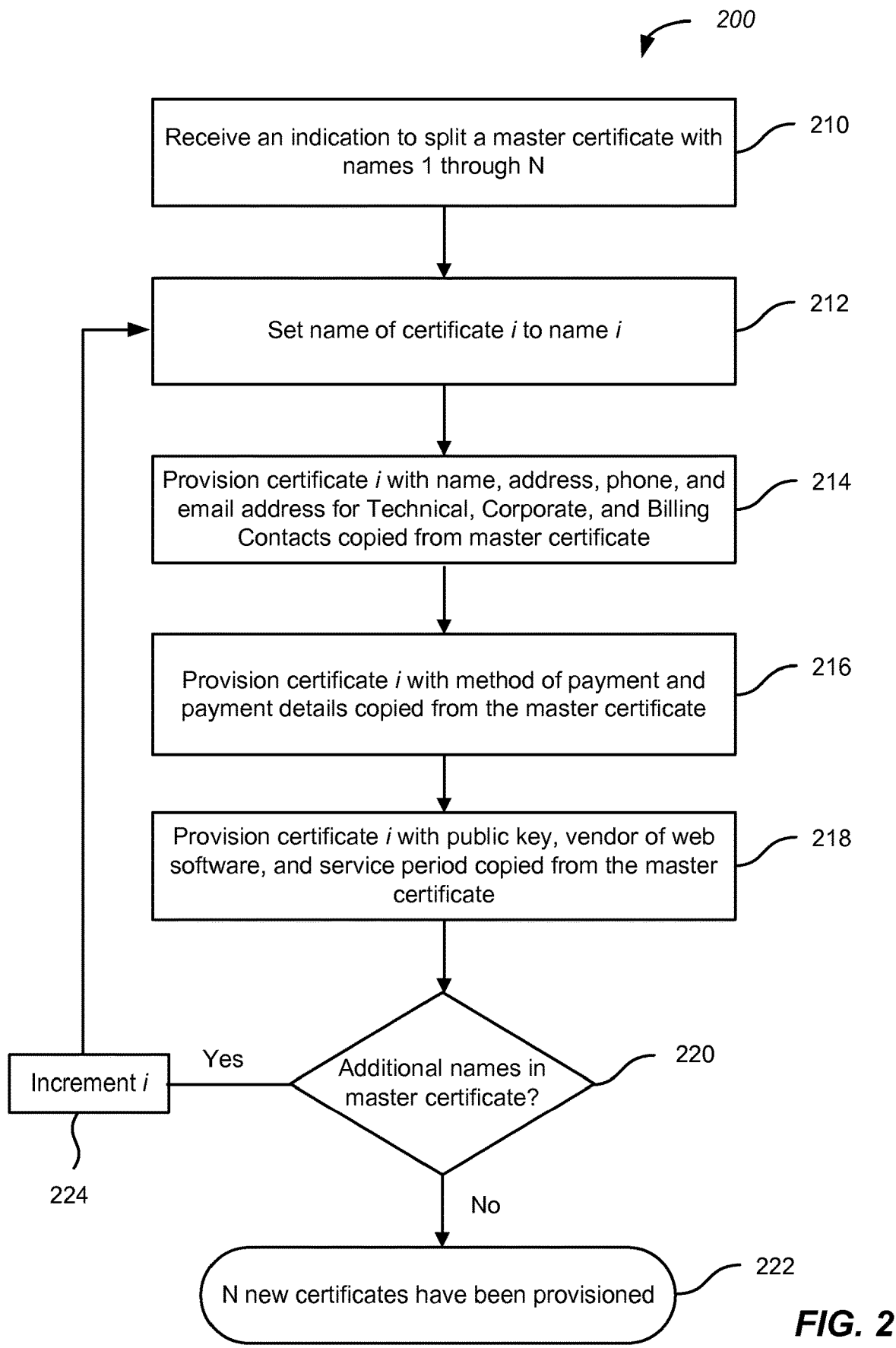
FIG. 2 is a simplified flowchart illustrating a method of provisioning new certificates based on a master certificate according to an embodiment of the present invention.

FIG. 2 is a simplified flowchart illustrating a method of provisioning new certificates based on a master certificate according to an embodiment of the present invention. The method 200 includes receiving an indication to split a master certificate having multiple names (210). In this example, the master certificate has N names, with one name stored in the Subject field and N−1 names stored in the SubjectAltName extension. A counter i (initially equal to one) is utilized in provisioning the N new certificates as illustrated in FIG. 2. The name of the $i^{th}$ certificate (initially the first certificate) is set to name i (initially the first name) (212). Certificate i is then provisioned using information copied from the master certificate including the name, address, phone, and email address for Technical, Corporate, and Billing Contacts (214), the method of payment and payment details (216), and the public key, vendor of web software, and service period (218) copied from the master certificate. The service period will typically be 1 year, 2 years, or the like. Additional information used in provisioning certificate i will also be copied from the master certificate.

A determination is made if there are additional names in the master certificate (220). Initially, there will, by definition, be at least one additional name stored in the SubjectAltName extension. If there are additional names, then the counter i will be incremented (224) and the next new certificate will be provisioned using the next name and information from the master certificate. In an embodiment, information for the next new certificate will be copied automatically from the master certificate once the name is pulled from the list of names associated with the master certificate. Once all N names in the master certificate have been used, N new certificates will have been provisioned for the user (222).

Thus, the method illustrated in FIG. 2 shares similarities with the method illustrated in FIG. 1. Particularly, since the user has already been approved to possess a certificate that includes the names stored in the master certificate, the CA can immediately issue the new certificates provisioned using the method 200. Embodiments of the present invention enable a CA that has provisioned a certificate with multiple names to a user to offer the user a "Split" feature. If the user has several certificates with multiple names, the user is allowed to indicate which certificate with multiple names is to be split. This certificate is referred to as the "master" certificate. As illustrated in FIG. 2, the CA can automatically create new certificates with the public key of the master certificate and the Common Name of the Subject field set to the Common Name of the master certificate or one of the names in the SubjectAltName extension of the master certificate. As illustrated in FIG. 2, details from the master certificate order can be automatically copied into the order details of each of the new "split" certificates.

It should be appreciated that the specific steps illustrated in FIG. 2 provide a particular method of provisioning new certificates based on a master certificate according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
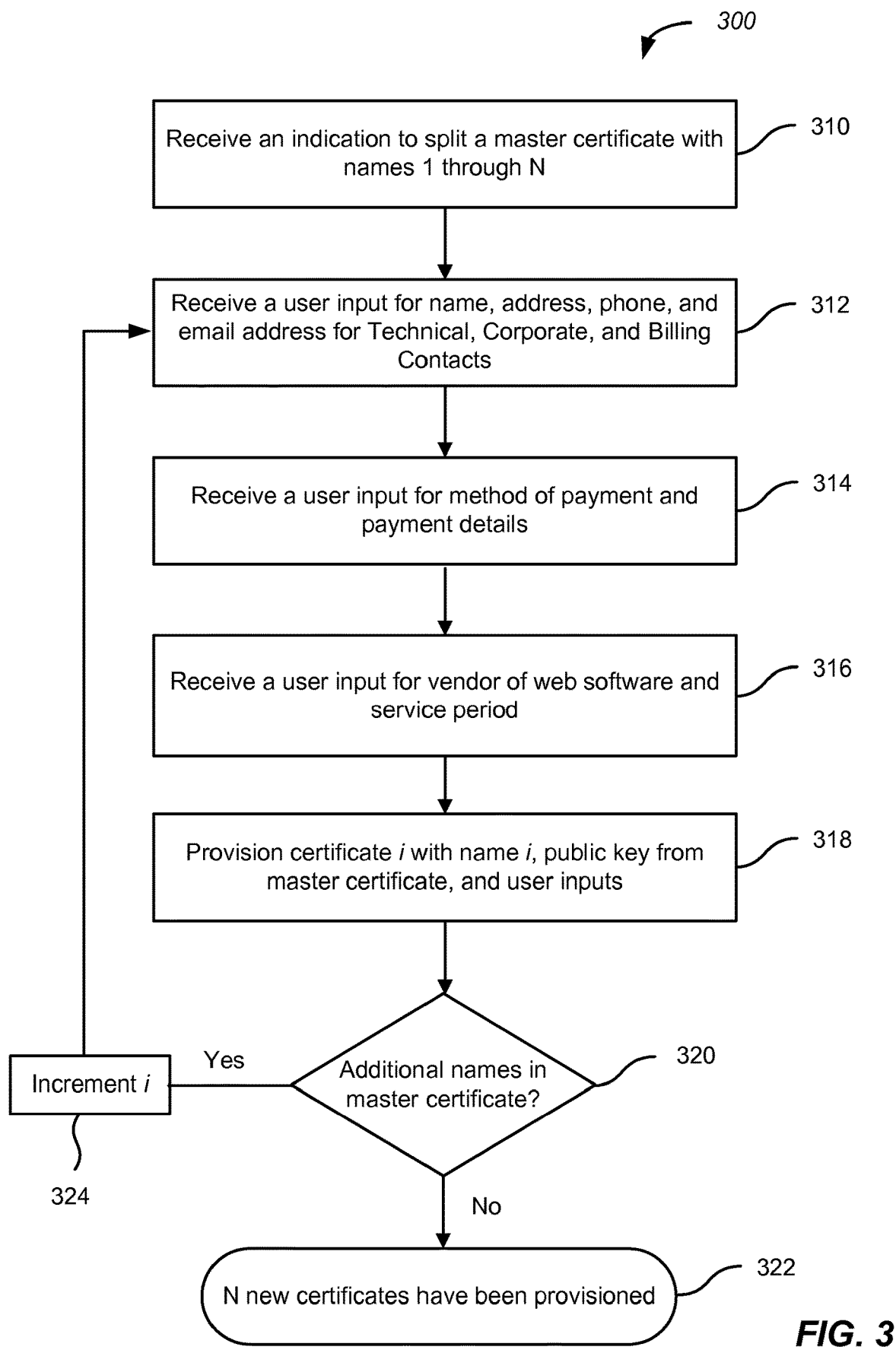
FIG. 3 is a simplified flowchart illustrating a method of provisioning multiple certificates according to an embodiment of the present invention.

FIG. 3 is a simplified flowchart illustrating a method of provisioning multiple certificates according to an embodiment of the present invention. FIG. 3 illustrates a method of provisioning certificates in which, instead of copying the order details from the master certificate to provide the order details of each of the "split" certificates, the user will be prompted to enter the order details (e.g., technical, corporate, and billing contact information, method of payment, vendor of web server software, validity period, and the like) for each of the "split" certificates. The prompt to the user may be provided by portions of a graphical user interface (GUI) adapted to display information to and receive inputs from the user. Thus, the term prompt is used in a broad sense to include selections made by the user using drop-down menus, blank input boxes, and the like. The method 300 includes receiving an indication to split a master certificate with multiple names (i.e., names 1 through N) (310). The user will be prompted to enter the information that will be used in provisioning the new "split" certificates. In this embodiment, only the names and the public key from the master certificate will be copied from the master certificate.

A user input will be received including the name, address, phone, and email address for Technical, Corporate, and Billing Contacts (312), the method of payment and payment details (314), the vendor of web software, and the service period (316). In addition, other information from the master certificate can be used in provisioning the new certificates. The CA will provision the $i^{th}$ certificate (318) using name i, the public key from master certificate, and the user inputs received in steps 312-316.

A determination is made if there are additional names in the master certificate (320). Initially, there will, by definition, be at least one additional name stored in the SubjectAltName extension. If there are additional names, then the counter i will be incremented (324) and user inputs will be received for use in provisioning the next new certificate. Once all N names in the master certificate have been used, N new certificates will have been provisioned for the user (322).

It should be appreciated that the specific steps illustrated in FIG. 3 provide a particular method of provisioning multiple certificates according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
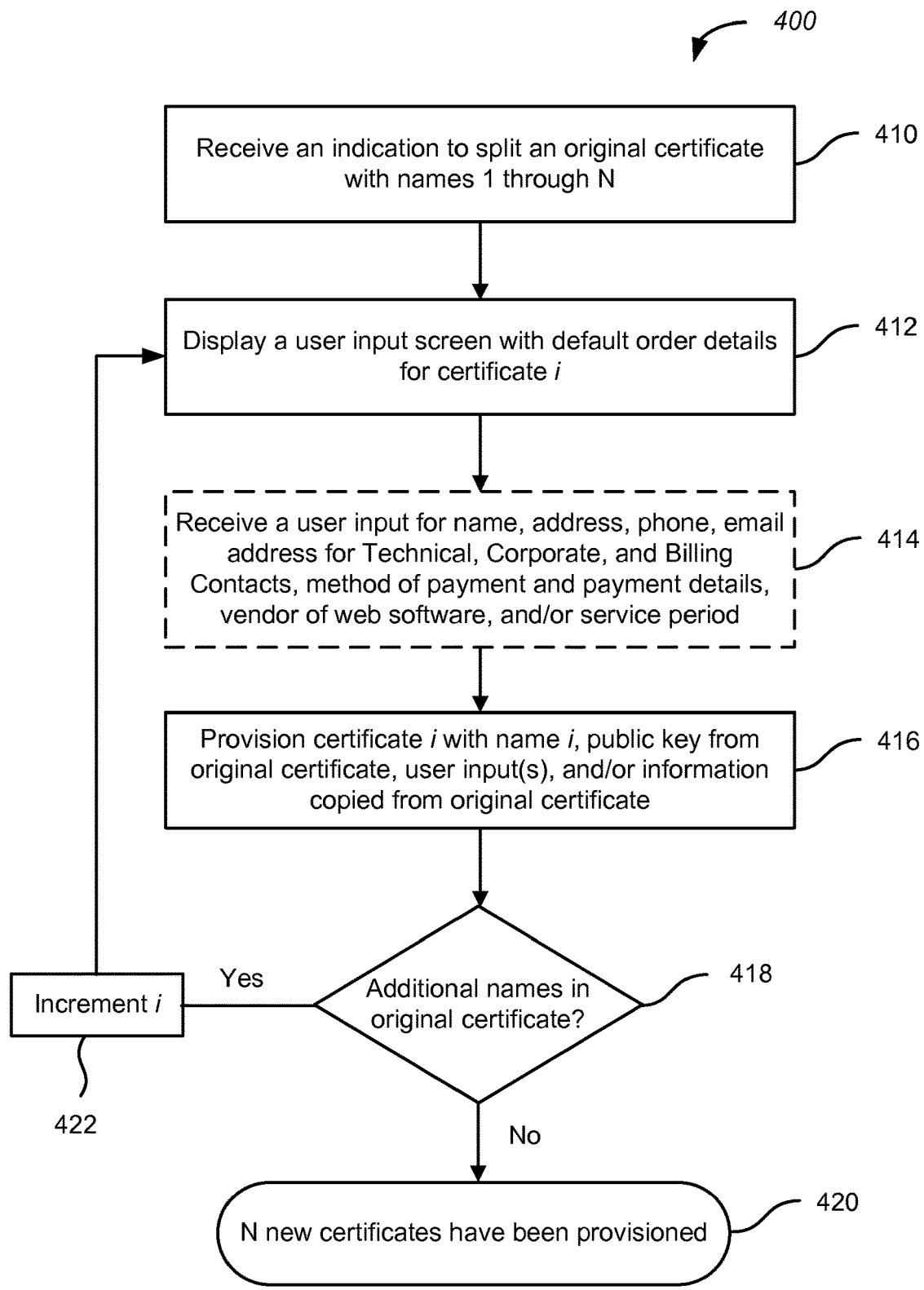
FIG. 4 is a simplified flowchart illustrating a method of provisioning multiple certificates from an original certificate according to an embodiment of the present invention.

FIG. 4 is a simplified flowchart illustrating a method of provisioning multiple certificates from an original certificate according to an embodiment of the present invention. In the embodiment illustrated in FIG. 4, the default values for the order details for the new "split" certificates will be copied from the original certificate, with the user having the ability to modify the particular order details as desired. As an example, each of the data fields for the order details can be pre-filled with the corresponding details (i.e., default values) copied from the original certificate order. The method illustrated in FIG. 4 will thus provide a user with a convenient interface in situations where the user desires to keep most of the order details the same while changing a few of the particular order details.

The method 400 includes receiving an indication to split the original certificate (i.e., the master certificate) having multiple names (i.e., names 1 through N) (410). A user input screen is displayed with the order details having default values copied from the original certificate (412). The user is able to modify the order details as desired, including the name, address, phone, and email address for Technical, Corporate, and Billing Contacts, the method of payment and payment details, the vendor of web software, and/or the service period (414). The user may change one or more of the default values for use in provisioning the new certificate i. Certificate i is then provisioned with name i, the public key from the original certificate, and the information from the user input screen (416). The information from the user input screen will include user input(s) and/or information copied from the original certificate depending on how many changes the user made in customizing the new certificate. Thus, the user has great flexibility in provisioning the split certificates while having a convenient interface filled with default values.

A determination is made if there are additional names in the original certificate (418). Initially, there will, by definition, be at least one additional name stored in the SubjectAltName extension. If there are additional names, then the counter i will be incremented (422) and the default order details for the master certificate will be displayed to the user (412). As with the first new certificate, the default information may be updated by the user (414) as desired. Once all N names in the original certificate have been used, N new certificates will have been provisioned for the user (420).

It should be appreciated that the specific steps illustrated in FIG. 4 provide a particular method of provisioning multiple certificates from an original certificate according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
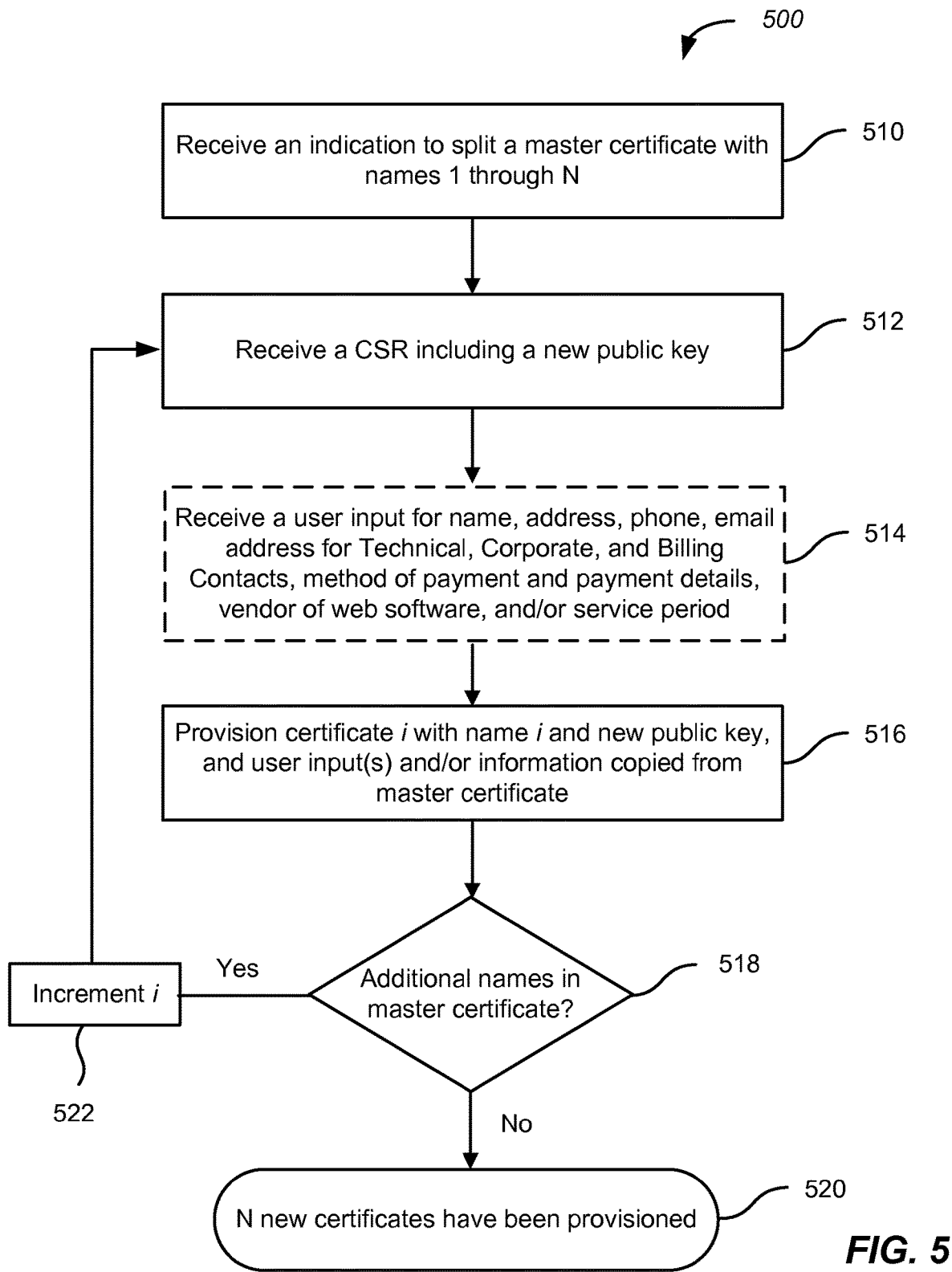
FIG. 5 is a simplified flowchart illustrating a method of provisioning new certificates using new Certificate Signing Requests according to an embodiment of the present invention.

FIG. 5 is a simplified flowchart illustrating a method of provisioning new certificates using new Certificate Signing Requests according to an embodiment of the present invention. In the embodiment illustrated in FIG. 5, instead of the new certificates containing the public key of the master certificate, the user provides a distinct Certificate Signing Request (CSR) containing a distinct public key for each of the new certificates. The method 500 includes receiving an indication to split a master certificate having multiple names (510). The user provides a CSR including a new public key. The CSR including the new public key is received (512). As described more fully below, the new public key will be used in provisioning the first new certificate of the N new certificates.

The user is then able to optionally enter new information for use in provisioning the first new certificate (514). As discussed in relation to FIG. 4, default values for the certificate information may be provided in a GUI that the user can amend as desired. One of ordinary skill in the art would recognize many variations, modifications, and alternatives. A first new certificate is then provisioned using the first name from the master certificate, the new public key, and either information from the master certificate or user inputs received during step 514 (516).

A determination is made if there are additional names in the original certificate (518). Initially, there will, by definition, be at least one additional name stored in the SubjectAltName extension. If there are additional names, then the counter i will be incremented (522) and an additional new CSR will be received for use in provisioning the next new certificate. As with the first new certificate, the information for provisioning the additional new certificates can be information copied from the master certificate by default or provided by the user. Once all N names in the original certificate have been used, N new certificates will have been provisioned for the user (520).

Utilizing the embodiment illustrated in FIG. 5, the user is provided with both convenience and the flexibility to use new CSRs in provisioning the new certificates. Another implementation (not shown) is for the user to have the option of using the original public key for one or more of the new certificates while providing new CSRs for the remaining new certificates. One of ordinary skill in the art would recognize many variations, modifications, and alternatives.

It should be appreciated that the specific steps illustrated in FIG. 5 provide a particular method of provisioning new certificates using new Certificate Signing Requests according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
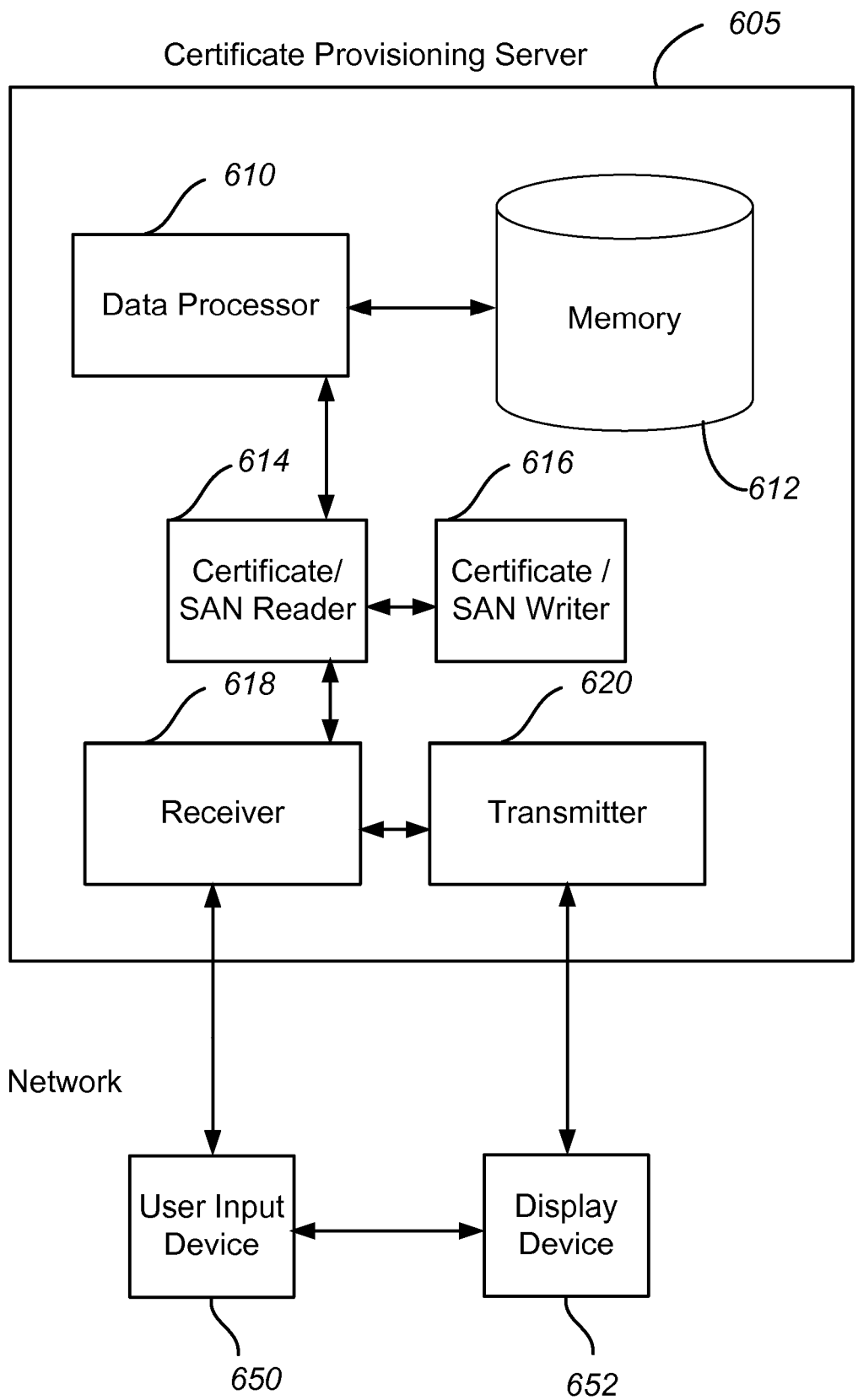
FIG. 6 is a simplified schematic diagram of a certificate provisioning system according to an embodiment of the present invention.

FIG. 6 is a simplified schematic diagram of a certificate provisioning system according to an embodiment of the present invention. The certificate provisioning system includes a certificate provisioning server 605. The server is typically operated by a CA as part of a larger certificate management system. The certificate provisioning server 605 includes a processor 610 (also referred to as a data processor), and a memory 612. The processor 610 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The memory (also referred to as a database or a computer readable medium) 612 can be local or distributed as appropriate to the particular application. The memory can store information related to the certificates previously issued by the CA, program code and instructions executed by the processor 610, and other suitable data. In an exemplary embodiment, the memory 612 stores historical records for each certificate issued by the CA including the certificate order information displayed in step 412 illustrated in FIG. 4.

Memory 612 may include a number of memories including a main random access memory (RAM) for storage of instructions and data during program execution and a read only memory (ROM) in which fixed instructions are stored. Thus, memory 612 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The certificate provisioning server 605 also includes a certificate reader 614 and a certificate writer 616. The certificate reader 614 is used to parse the certificate, extract names from the Subject field and the SubjectAltName extension of the certificate, and provide information used in provisioning of certificates. As an example, the certificate reader 614 is used to determine one or more names stored in the master certificate for later use in provisioning of the new split certificates. The certificate writer is used to provision the new split certificates as discussed in relation to steps 120 and 122 illustrated in FIG. 1 as well as other provisioning methods described herein. The provisioning process includes listing or storing names in either the Subject field or the SubjectAltName extension of the certificates as well as other information.

The certificate provisioning server 605 also includes a receiver 618 and a transmitter 620. The receiver 618 and the transmitter 620 are operable to interact with a user input device 650 and a display device 652 over a network. The network can be the Internet or other network suitable for the communication of data and commands. Thus, a user is able, through a user interface interacting with the user input device 650 and the display device 652 to submit information related to an existing certificate as discussed in step 110 of FIG. 1 and to request that the existing certificate be split into multiple new certificates as discussed in step 112 of FIG. 1. Additionally, the user input device 650 and the display device 652 can be used to receive CSRs from the user, display default order information related to the existing certificate, receive inputs from the user related to this information, other functions described throughout the specification, and the like. The user input device 650 and the display device 652 can be components of a personal computer, a web application, or the like. Typically, the user will interact with the certificate provisioning server 605 using one or more (GUIs) receiving input through user input device 650 and displaying output through display device 652.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   receiving, over a network and from a client computing device associated with a user, a request to split a first digital certificate, wherein the user is approved to be associated with the first digital certificate, wherein the first digital certificate is used to verify an identity of the user by linking a public key, a first name, and a second name;

extracting, by at least one computer processor, the first name and the second name from the first digital certificate, wherein extracting the first and second names comprises extracting the first name from a Subject data field of the first digital certificate and the second name from a SubjectAltName extension of the first digital certificate;

in response to receiving the request to split the first digital certificate, and based at least in part on approval of the user to be associated with the first digital certificate, provisioning, by the at least one computer processor, a second digital certificate with the first name and a third digital certificate with the second name, wherein the first name is stored in a Subject data field of the second digital certificate, and wherein the second name is stored in a Subject data field of the third digital certificate;

issuing the second digital certificate and the third digital certificate to the user based at least in part on approval of the user to be associated with the first digital certificate; and delivering authentication information using either the second digital certificate or the third digital certificate to verify the identity of the user.

2. The method of claim 1, wherein the first digital certificate comprises a first public key, the method further comprising:

extracting the first public key from the first digital certificate, wherein provisioning the second and third digital certificates comprises provisioning the second and third digital certificates with the first public key.

3. The method of claim 1, wherein the first digital certificate comprises a first public key, the method further comprising:

receiving a first certificate signing request and a second certificate signing request, wherein:

the first certificate signing request comprises a second public key different from the first public key, the second certificate signing request comprises a third public key different from the first public key, provisioning the second digital certificate comprises provisioning the second digital certificate with the second public key, and provisioning the third digital certificate comprises provisioning the third digital certificate with the third public key.

4. The method of claim 1, wherein the first digital certificate further comprises a third name stored in the SubjectAltName extension, the method further comprising:

extracting the third name from the SubjectAltName extension of the first digital certificate; and provisioning a fourth digital certificate with the third name, wherein the third name is stored in a Subject data field of the fourth digital certificate.

5. The method of claim 4, wherein the first digital certificate comprises a first public key, the method further comprising:

extracting the first public key from the first digital certificate, wherein provisioning the second, third, and fourth digital certificates comprises provisioning the second, third, and fourth digital certificates with the first public key.

6. The method of claim 4, wherein the first digital certificate comprises a first public key, the method further comprising:

receiving a first certificate signing request, a second certificate signing request, and a third certificate signing request, wherein:

the first certificate signing request comprises a second public key different from the first public key, the second certificate signing request comprises a third public key different from the first public key, the third certificate signing request comprises a fourth public key different from the first public key, provisioning the second digital certificate comprises provisioning the second digital certificate with the second public key, provisioning the third digital certificate comprises provisioning the third digital certificate with the third public key, and provisioning the fourth digital certificate comprises provisioning the fourth digital certificate with the fourth public key.

7. The method of claim 1, wherein provisioning the second digital certificate with the first name and the third digital certificate with the second name comprises digitally signing the second and third digital certificates with a private key of a certificate authority.

8. A system comprising:

a network interface configured to receive, over a network and from a client computing device associated with a user, a request to split a first digital certificate, wherein the user is approved to be associated with the first digital certificate, wherein the first digital certificate is used to verify an identity of the user by linking a public key, a first name, and a second name;

one or more memories that store instructions and the first digital certificate; and at least one computer processor, operatively coupled to the one or more memories and the network interface, configured to execute the instructions to:

extract the first name and the second name from the first digital certificate, wherein, to extract the first and second names, the at least one computer processor is configured to extract the first name from a Subject data field of the first digital certificate and the second name from a SubjectAltName extension of the first digital certificate;

based at least in part on approval of the user to be associated with the first digital certificate, provision a second digital certificate with the first name and a third digital certificate with the second name, wherein the first name is stored in a Subject data field of the second digital certificate, and wherein the second name is stored in a Subject data field of the third digital certificate;

issue the second digital certificate and the third digital certificate to the user based at least in part on approval of the user to be associated with the first digital certificate; and deliver authentication information using either the second digital certificate or the third digital certificate to verify the identity of the user.

9. The system of claim 8, wherein the first digital certificate comprises a first public key, and wherein the at least one computer processor is further configured to extract the first public key from the first digital certificate and to provision the second and third digital certificates with the first public key.

10. The system of claim 8, wherein the first digital certificate comprises a first public key, and wherein the at least one computer processor is further configured to:

receive a first certificate signing request and a second certificate signing request, wherein:
the first certificate signing request comprises a second public key different from the first public key;
the second certificate signing request comprises a third public key, different from the first public key; and
the at least one computer processor is further configured to provision the second digital certificate with the second public key and the third digital certificate with the third public key.

11. The system of claim 8, wherein the first digital certificate further comprises a third name stored in the SubjectAltName extension, wherein the at least one computer processor is further configured to extract the third name from the SubjectAltName extension of the first digital certificate and to provision a fourth digital certificate with the third name, wherein the third name is stored in a Subject data field of the fourth digital certificate.

12. The system of claim 11, wherein the first digital certificate comprises a first public key, wherein the at least one computer processor is further configured to extract the first public key from the first digital certificate and to provision the second, third, and fourth digital certificates with the first public key.

13. The system of claim 11, wherein the first digital certificate comprises a first public key, and wherein the at least one computer processor is further configured to:
receive a first certificate signing request, a second certificate signing request, and a third certificate signing request, wherein:
the first certificate signing request comprises a second public key different from the first public key;
the second certificate signing request comprises a third public key different from the first public key;
the third certificate signing request comprises a fourth public key different from the first public key; and
the at least one computer processor is further configured to provision the second digital certificate with the second public key, the third digital certificate with the third public key, and the fourth digital certificate with the fourth public key.

14. The system of claim 8, wherein the at least one computer processor is further configured to digitally sign the second and third digital certificates with a private key of a certificate authority.

15. A method for a certificate authority to facilitate efficient splitting of a first digital certificate into at least second and third digital certificates, the method comprising:
receiving, with at least one computer processor, from a client computing device associated with a user, a request to split the first digital certificate, the first digital certificate including a first name in a Subject data field and a second name in a SubjectAltName extension, wherein the user is approved to possess the first digital certificate, wherein the first digital certificate is used to verify an identity of the user by linking a public key, a first name, and a second name;
extracting, with the at least one computer processor, the first name from a Subject field of the first digital certificate and the second name from a SubjectAltName extension of the first digital certificate;
in response to the request to split the first digital certificate and based at least in part on approval of the user to possess the first digital certificate, provisioning, by the at least one computer processor, a second digital certificate with the first name and a third digital certificate with the second name, wherein the first name is stored in a Subject data field of the second digital certificate and wherein the second name is stored in a Subject data field of the third digital certificate;
issuing the second digital certificate and the third digital certificate to the user based at least in part on approval of the user to possess the first digital certificate; and
delivering authentication information using either the second digital certificate or the third digital certificate to verify the identity of the user.

16. The method of claim 15, further comprising:
determining, with the at least one computer processor, a validity end date of the first digital certificate, wherein provisioning the second and third digital certificates comprises provisioning the second and third digital certificates with the same validity end date as the first digital certificate.

17. The method of claim 15, wherein provisioning the second and third digital certificates comprises provisioning the second and third digital certificates with different validity end dates.

18. The method of claim 15, wherein provisioning comprises digitally signing the second and third digital certificates with a private key of a certificate authority.

19. The method of claim 15, wherein the first digital certificate comprises a first public key, the method further comprising:
extracting the first public key from the first digital certificate, wherein provisioning the second and third digital certificates comprises provisioning the second and third digital certificates with the first public key.

* * * * *